C. W. COURT.
END REENFORCEMENT FOR BOX CARS.
APPLICATION FILED APR. 10, 1919.

1,432,969.

Patented Oct. 24, 1922.

Witnesses:
W. F. Kilroy
Harry R. L. White

Inventor:
Clarence W. Court
By Barnett Furman
Att'ys.

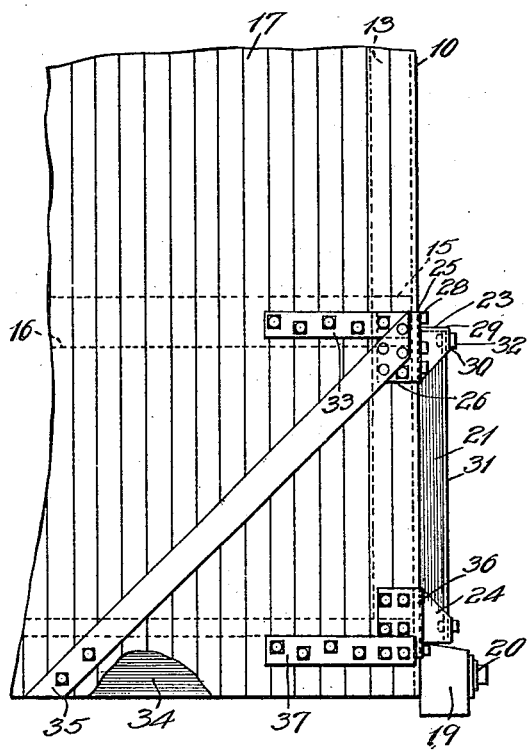
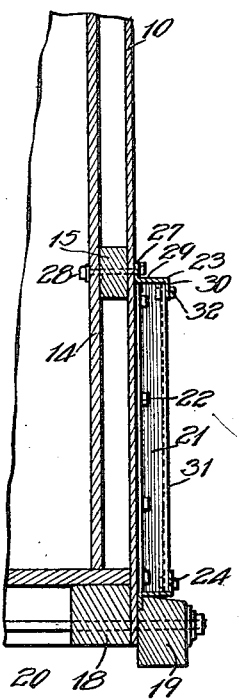
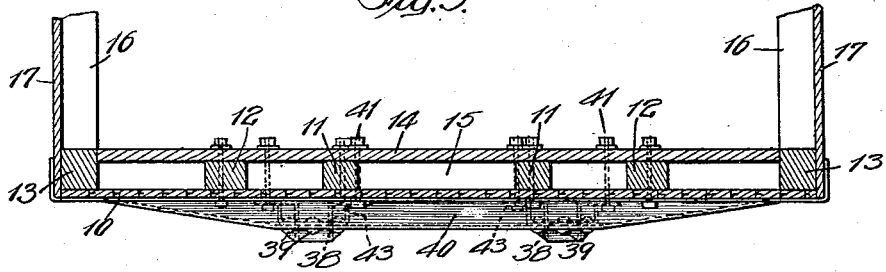

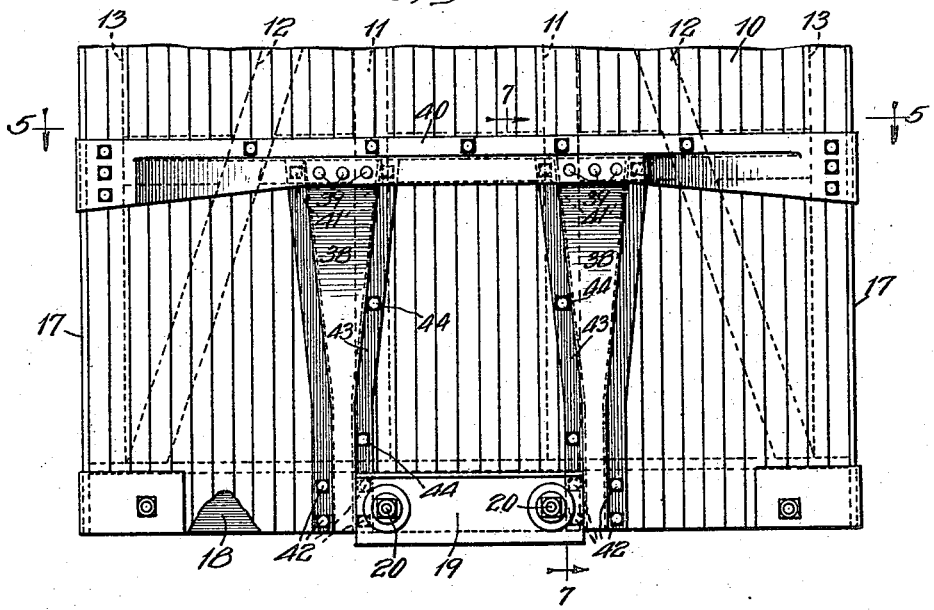
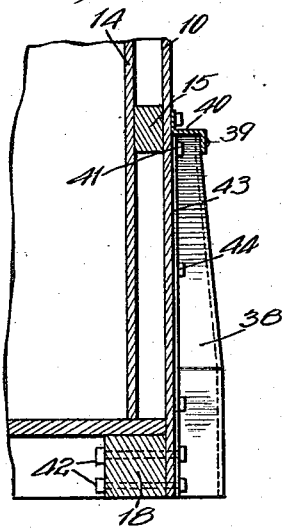
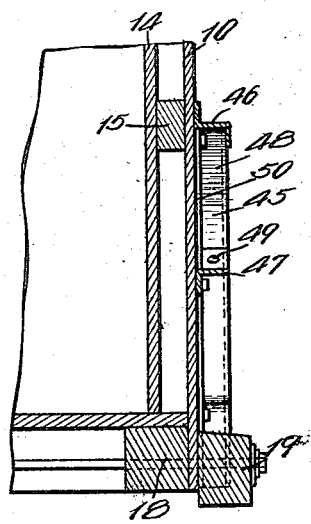

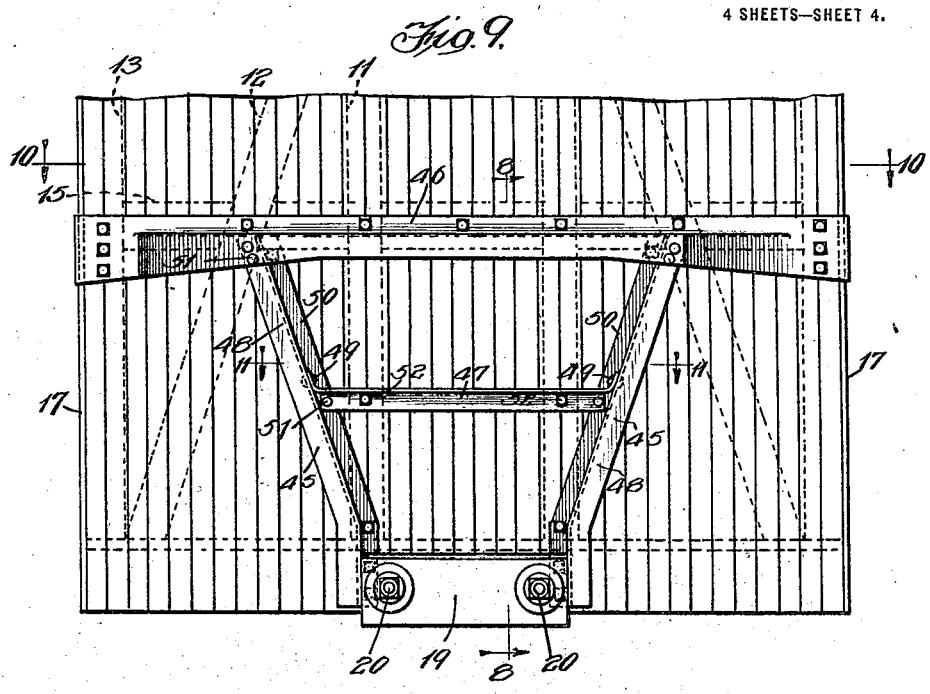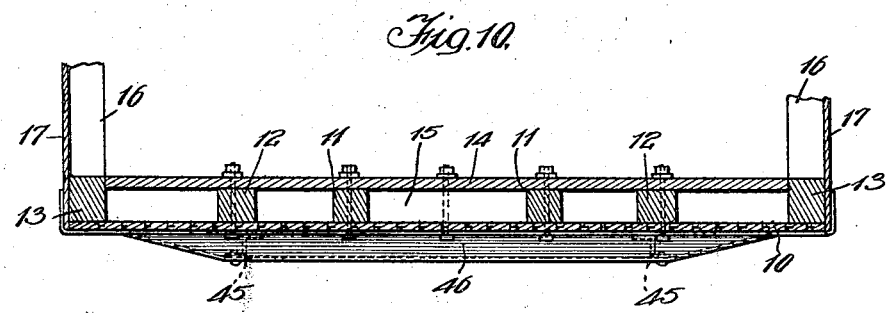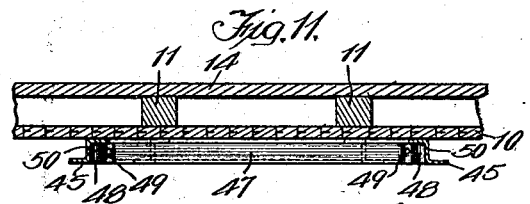

Patented Oct. 24, 1922.

1,432,969

UNITED STATES PATENT OFFICE.

CLARENCE W. COURT, OF CHICAGO, ILLINOIS, ASSIGNOR TO WALTER P. MURPHY, OF NEW YORK, N. Y.

END REENFORCEMENT FOR BOX CARS.

Application filed April 10, 1919. Serial No. 289,114.

*To all whom it may concern:*

Be it known that I, CLARENCE W. COURT, a citizen of the United States, residing at Chicago, in the county of Cook and State of Illinois, have invented certain new and useful Improvements in End Reenforcements for Box Cars, of which the following is a specification.

My invention relates to reenforcement for the end wall of a railway car, more particularly a box freight car, and the principal object of the invention is to provide a simple and inexpensive reinforcing structure intended particularly for strengthening the wooden end walls of railway box cars, which may be used for the repair of old cars as well as in the construction of new cars, and which will give maximum of strength and rigidity at the places requiring reenforcement, with the use of a minimum amount of metal.

The invention consists in the new and improved arrangements, devices and combinations, to be hereinafter described and claimed, for carrying out the above stated objects and such other incidental objects as will appear from the following description of certain preferred embodiments of the invention as shown in the drawings appended hereto.

In the drawings,

Fig. 3 is a fragmentary view, in elevation, of the lower portion of the side of the car.

Fig. 4 is a vertical sectional view on line 4—4 of Fig. 1.

Fig. 5 is a view similar to Fig. 2, illustrating a modification, this view being taken on line 5—5 of Fig. 6.

Fig. 6 is a fragmentary end view of the modified construction.

Fig. 7 is a sectional view on line 7—7 of Fig. 6.

Figure 1:
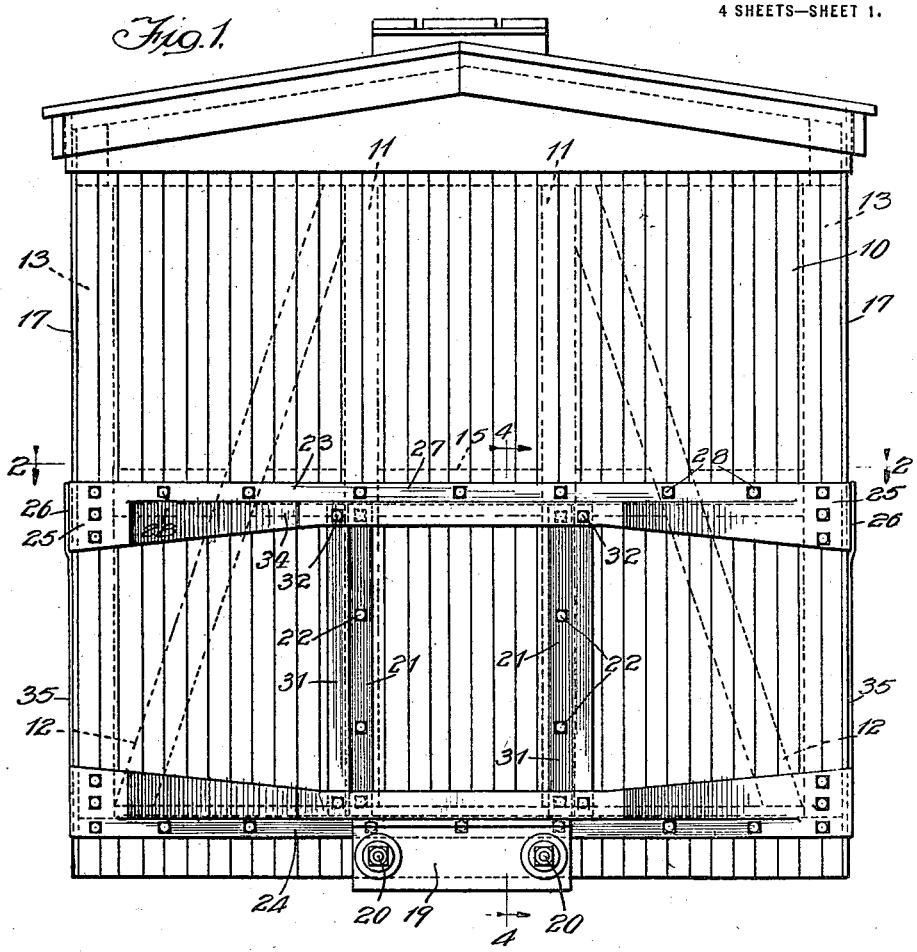
Fig. 1 is an end elevation of the superstructure of a railway box car of wood construction reinforced in accordance with this invention.

Fig. 8 is a view, similar to Fig. 7, taken on line 8—8 of Fig. 9, illustrating a different embodiment of the invention, and Figs. 10 and 11 are fragmentary, sectional plans on lines 10—10 and 11—11, respectively, of Fig. 9.

Like characters of reference designate like parts in the several figures of the drawings.

Referring to the drawings, 10 designates the end sheathing of a railway box car of wood construction, 12 the diagonal posts or braces of the end structure, 13 the corner posts, 14 the inner lining, 15 the end belt rail, 16 the side belt rail, 17 the side sheathing, 18 the end sill, 19 the dead wood, and 20 truss rods which extend lengthwise of the car through the dead wood and end sill. The car structure as above described is of familiar type.

Figure 2:
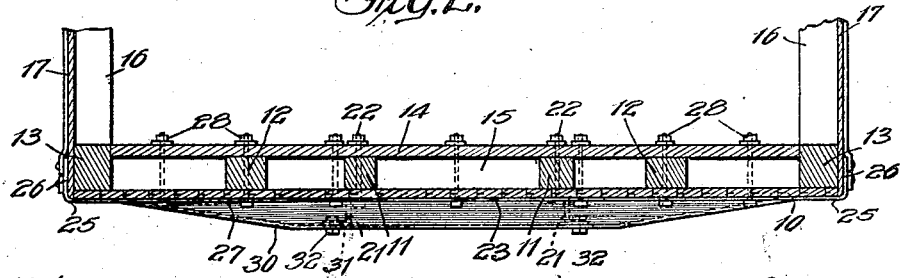
Fig. 2 is a fragmentary sectional plan on line 2—2 of Fig. 1.

The reenforcement illustrated in Figs. 1 to 4 inclusive, comprises a pair of upright members 21 preferably Z-bars and aligned with the end posts 11 and secured to the same by bolts 22, together with a transverse reinforcing member 23, preferably at the level of the belt rail 15, and if the situation requires it, a second reinforcing member 24 at the floor of the car. The reinforcing member 23 is preferably a pressed steel member, the end portions 25 of which are flat and formed with angular wings 26 which overlap the sides of the car, the intervening portion being pressed to a Z shape, providing a flange 27 adapted to be secured to belt rail 15 by bolts 28 and outstanding web 29 and a depending flange 30. The upper ends of the upright members 21 bear against the horizontal web 29 and the depending flange 30 of the transverse member 23. The outer flanges 31 of the Z bars 21 may be secured by bolts, or other fastening devices, 32 to the depending flange 30 of the transverse reinforcing member 23. The angular wing members of the latter are preferably anchored to the side belt rails by anchoring gussets 33 and to the side sills 34 of the car by diagonal tie members 35.

The transverse member 24 at the floor of the car, the use of which is optional, is preferably a pressed steel member like the member 23 but arranged in inverted position. The lower ends of the Z bars 21 are fitted to the member 24 and secured thereto in the same way that the upper ends are fitted and secured to the transverse member 23. The wings 36 of the lower transverse member 24 may be anchored by anchoring strips 37 to the side sills 34 of the car.

The metallic structure just described provides a very light and strong reenforcement for the lower portion of the end wall of a railway box car. It is this portion of the car which gets the hardest service due to shifting cargoes. If desired, the transverse member 23 might be placed at a point higher than the belt rail with a corresponding lengthening of the upright reinforcing members 21.

In Figs. 5, 6 and 7 a modified construction is shown. The lower transverse reinforcing member is omitted and the upright reenforcements are pressed, channel-shaped members 38 which are so formed as to be relatively wide at the top without much depth and narrower and deeper at the bottom. These members may be pressed in this way from a sheet of uniform width. The depth at the bottom gives strength to resist cargo thrusts and these thrusts are likely to be severest near the floor of the car where heavy articles are loaded, while the width of the members at the top allows them to be fastened by three rivets 39 to the transverse member 40 and by two bolts 41, a considerable distance apart, to the belt rail 15. The lower ends of the upright members 38 are secured each by two pairs of bolts 42 to the end sill 18 of the car. The inner flanges 43 of the upright members 38 are fastened to the end posts 11 by bolts 44 and the bottom portions of these flanges are overlapped by the dead wood 19.

Another embodiment of the invention is shown in Figs. 8 to 11 inclusive. The upright members 45 in this construction diverge from their places of attachment to the end sill and about midway between the transverse reinforcing member 46 and the floor of the car the upright members are connected by an angular strut 47 secured to the outstanding webs 48 of members 45 by rivets 49 and to the inner flanges 50 of the members 45 by rivets 51. The strut member is preferably fastened to the end posts 11 by bolts 52.

I claim:

1. In combination with the wooden end wall of a railway car, a metal reenforcement on the outside of said end wall, comprising a horizontal member Z-shaped in cross section extending across the car from side to side adjacent the belt rail, and a pair of spaced, substantially upright members secured to said horizontal member with their opposite ends anchored to the framing of the car.

2. In combination with the wooden end wall of a railway car, a metal reenforcement on the outside of said end wall, comprising a horizontal member extending across the car from side to side intermediate the roof and floor, a pair of spaced, substantially upright members secured to said horizontal member with their opposite ends anchored to the framing of the car, and diagonal tie members on the sides of the car anchoring the ends of said horizontal member to the underframe.

3. In combination with the wooden end wall of a railway car, a metal reenforcement on the outside of said end wall, comprising a horizontal member Z-shaped in vertical section extending across the car from side to side on the outside of the sheathing and substantially midway between the top and bottom of the end wall, and a pair of spaced, substantially upright members secured to said horizontal member with their opposite ends anchored to the framing of the car.

4. In combination with the wooden end wall of a railway car, a metal reenforcement on the outside of said end wall comprising a horizontal member Z-shaped in vertical section, extending across the car from side to side on the outside of the sheathing and substantially midway between the top and bottom of the end wall, and a pair of substantially upright Z bars secured to said horizontal member with their opposite ends anchored to the framing of the car.

5. In combination with the wooden end wall of a railway car, a metal reenforcement on the outside of said end wall comprising a pressed steel member arranged horizontally across the car intermediate the roof structure and floor and formed with flat extremities for attachment to the car and with a portion Z-shaped in cross-section intermediate said extremities, and a pair of substantially upright members secured to said horizontal member with their opposite ends anchored to the framing of the car.

6. In combination with the wooden end wall of a railway car, a metal reenforcement on the outside of said end wall substantially midway between the floor and roof comprising a pressed steel member arranged horizontally across the car and formed with flat end portions for attachment to the car, and with the intervening portion of Z section, and a pair of substantially upright members secured to said horizontal member with their opposite ends anchored to the framing of the car.

7. In combination with the wooden end wall of a railway car, a metal reenforcement on the outside of said end wall comprising a pressed steel member arranged horizontally across the car intermediate the roof structure and floor and formed with flat extremities for attachment to the car and with a portion Z-shaped in cross-section intermediate said extremities, and a pair of substantially upright Z bars, the upper ends of which are overlapped by and secured to one of the flanges of the Z section portion of said horizontal member, the opposite ends of said Z bars being anchored to the framing of the car.

8. The combination with the wooden end posts and wood sheathing of a box car, of a pair of metal reinforcing members secured to said end posts on the outside of said sheathing, and extending only part way up the end of the car, and a transverse member extending across the end of the car from side to side to which the aforesaid reinforcing members are attached, said transverse member being formed with an outstanding web which is of maximum width adjacent the center of the car and diminishes in width toward the sides thereof.

9. The combination with the wooden end posts and wood sheathing of a box car, of a pair of metal reinforcing members secured to said end posts on the outside of said sheathing, extending only part way up the end of the car, a transverse member extending across the end of the car from side to side on the outside of said sheathing to which the aforesaid reinforcing members are attached, said transverse member being formed with flat extremities and intermediate said extremities with an outstanding web, and a flange depending therefrom between which the upper ends of said reinforcing members are secured.

10. The combination with the wooden end posts and wood sheathing of a railway box car, of a pair of Z bars secured to the posts on the outside of said sheathing and extending only part way up the end of the car, and a tranverse member approximately midway between the floor and roof of the car Z-shaped in cross section which extends across the car from side to side and to which the upper ends of said reinforcing members are secured.

11. The combination with the wooden end posts and wood sheathing of a railway box car, of a pair of Z-bars secured to the posts on the outside of said sheathing and extending only part way up the end of the car, a transverse member Z-shaped in cross section which extends across the car from side to side approximately midway between the floor and roof of the car, and to which the upper ends of said reinforcing members are secured, said transverse member being formed with an outstanding web and with a flange depending therefrom against which the upper ends of said reinforcing members bear.

12. In combination with the wooden end wall of a railway box car, a metal end reenforcement comprising a pressed steel member extending transversely across the car at substantially the level of the belt rail thereof, the middle portion of which is Z-shaped in vertical section, a pair of Z-bars, the lower ends of which are secured to the under frame of the car, the upper ends diverging and being attached to said transverse member, and a strut member between said transverse member and the floor of the car which is secured at opposite ends to said Z-bars.

CLARENCE W. COURT.